United States Patent [19]

Chiang

[11] Patent Number: 4,560,712
[45] Date of Patent: Dec. 24, 1985

[54] POLYPROPYLENE COMPOSITIONS CONTAINING BIMODAL CALCIUM CARBONATE AND A POLYSILOXANE

[75] Inventor: Alan W. Chiang, East Windsor, N.J.
[73] Assignee: Mobil Oil Company, New York, N.Y.
[21] Appl. No.: 686,775
[22] Filed: Dec. 27, 1984
[51] Int. Cl.$^4$ ............................................. C08K 3/26
[52] U.S. Cl. .................................. 523/220; 523/200; 524/427
[58] Field of Search ............... 524/427, 506; 523/200, 523/220

[56] References Cited
U.S. PATENT DOCUMENTS 3,700,614 10/1972 Schenkerberg .................. 524/427
4,102,974 7/1978 Boni .................................. 524/427
4,273,691 6/1981 MacLaury et al. ............... 524/506
4,407,986 10/1983 Nomura et al. .................. 524/427

FOREIGN PATENT DOCUMENTS 55-120643 9/1980 Japan .................................. 524/427

Primary Examiner—L. T. Jacobs
Attorney, Agent, or Firm—Alexander J. McKillop; Michael G. Gilman; Edward J. Trojnar

[57] ABSTRACT

Physical properties of filled polypropylene compositions are improved by using a calcium carbonate filler of bimodal particle size, e.g., a mean of 2 microns and a mean of 5 microns, and a polysiloxane additive. The compositions are useful as food containers.

17 Claims, No Drawings

POLYPROPYLENE COMPOSITIONS CONTAINING BIMODAL CALCIUM CARBONATE AND A POLYSILOXANE

BACKGROUND OF THE INVENTION

Polypropylene compositions containing high proportions, e.g., 40 weight percent, of calcium carbonate as a filler are known. Such compositions are commercially used in the production of food containers. The requirements for commercial use include good flexural modulus, toughness and Gardner/Tup impact resulting in a container which is rigid and impact resistant. It is also important for commercial production that the compositions have a melt viscosity which permits reasonable molding cycle time. The compositions of this invention exhibit improved physical properties and acceptable melt viscosity and constitute an improvement especially adapted for production of food containers.

SUMMARY OF THE INVENTION

Compositions of polypropylene loaded with calcium carbonate are improved for use in making rigid food containers by using bimodal calcium carbonate which is preferably treated with calcium stearate, and a polysiloxane.

DETAILED DESCRIPTION OF THE INVENTION

The filled polypropylene compositions of this invention contain up to 50 weight percent of calcium carbonate. Preferably, the calcium carbonate content is from 5 to 50 weight percent and most preferably from about 40 to 50 weight percent. The calcium carbonate is finely divided into particles of less than 50 microns.

In accordance with this invention, bimodal calcium carbonate is used. The major proportion of the calcium carbonate has a significantly smaller mean particle size than that of the minor proportion. The weight ratio of the major proportion to the minor proportion is generally in the range of 3:1 to 5:1.

The mean particle size of the major proportion is advantageously from about 1 to 3 microns and the mean particle size of the minor proportion is advantageously from about 4 to 6 microns. It is to be understood that the particle size in both of these portions can vary widely. For example, a suitable small particle size material used in the example has a mean particle size of 2 microns and its particle size distribution ranges from 0.5 to about 8 microns. Similarly, a suitable large particle size calcium carbonate used in the examples has a mean particle size of about 5 microns and its particle size distribution ranges from about 0.3 to 50 microns, although its major constituents have particle sizes ranging from 0.4 to 25 microns. In any case, the bimodal nature of the calcium carbonate is believed to contribute to the advantageous results which are obtained in accordance with this invention.

It is preferred that the calcium carbonate be treated. Suitable treating agents are metal salts of fatty acids. Calcium carbonate treated with calcium stearate as used in the examples has been found particularly suitable.

In addition to the polypropylene and calcium carbonate, the compositions of this invention include a polysiloxane. Poly(di-lower alkyl siloxane) can be used, in particular polydimethylsiloxane. The polysiloxane is used in small but effective amounts which are generally in the range of 0.01 to about 0.5 weight percent, preferably 0.02 to about 0.2 weight percent.

The various modifications which are made in accordance with this invention to improve on polypropylene filled with untreated monomodal calcium carbonate have complex interrelationships. For example, the use of calcium stearate treated calcium carbonate instead of untreated calcium carbonate generally gives better impact strength but flexural modulus suffers and this is an important quality for food containers. Higher loadings of calcium carbonate improve flexural modulus but result in reduced toughness. The siloxane increases toughness as does the use of bimodal calcium carbonate. Accordingly, by using all of the features of this invention, compositions having a balance of properties which make them particularly suitable for use in the production of rigid food containers are obtained.

This invention is illustrated by the following non-limiting examples in which all parts are by weight unless otherwise specified.

EXAMPLE 1

Filled polypropylene samples containing 35.44 weight percent of calcium stearate treated calcium carbonate having a mean particle size of 2 microns (OMYACARB FT available from Omya Inc.), and 8.86 weight percent of a calcium stearate treated calcium carbonate having a mean particle size of 5 microns (OMYA BLH) were prepared. The physical properties were compared to control samples made of polypropylene loaded with 38 weight percent of untreated calcium carbonate having a mean particle size of 2 microns (OMYACARB F). The samples containing bimodal calcium carbonate were about 10 percent higher in flexural modulus, 25 percent higher in toughness and 40 percent higher in Gardner/Tup impact than the control samples.

EXAMPLE 2

Additional samples were prepared by adding 0.074 weight percent of polydimethylsiloxane to the composition of Example 1 and again comparing physical properties to the control samples containing 38 weight percent of calcium carbonate. The samples with polydimethylsiloxane exhibited about 5 percent higher flexural modulus, 40 percent higher toughness and 70 percent higher Gardner/Tup impact than the control samples.

The physical properties of the compositions of Examples 1 and 2 render these compositions suitable for use in food containers.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

I claim:

1. A composition suitable for molding into a food container comprising:
   (A) polypropylene;
   (B) 5 to 50 weight percent of bimodal calcium carbonate of a particle size less than 50 microns the first major portion of which has a mean particle size which is significantly smaller than the second minor portion; and
   (C) a polysiloxane.

2. The composition of claim 1 in which said bimodal calcium carbonate comprises a first portion having a mean particle size of from 1 to 3 microns and a second portion having a mean particle size of 4 to 6 microns.

3. The composition of claim 1 in which at least said first portion of calcium carbonate is treated with a salt of a fatty acid.

4. The composition of claim 1 in which at least said first portion of calcium carbonate is treated with calcium stearate.

5. The composition of claim 1 in which the calcium carbonate comprises 40 to 50 weight percent of the composition.

6. The composition of claim 1 in which the weight ratio of said first portion to said second portion of calcium carbonate is 3:1 to 5:1.

7. The composition of claim 6 in which at least said first portion of calcium carbonate is treated with calcium stearate.

8. The composition of claim 1 in which said polysiloxane is a poly(di-lower alkyl) siloxane.

9. The composition of claim 1 in which said polysiloxane is polydimethylsiloxane.

10. The composition of claim 1 in which said polysiloxane comprises 0.01 to 0.5 weight percent of said composition.

11. The composition of claim 1 in which said first portion of calcium carbonate is treated with calcium stearate and has a mean particle size of 1-3 microns; said second portion of calcium carbonate has a mean particle size of 4-6 microns; the weight ratio of said first portion to said second portion is 3:1 to 5:1; the total amount of calcium carbonate is 40 to 50 weight percent; and said polysiloxane is polydimethylsiloxane in an amount of 0.01 to 0.2 weight percent of the composition.

12. A food container made from the composition of claim 1.

13. A food container made from the composition of claim 2.

14. A food container made from the composition of claim 5.

15. A food container made from the composition of claim 6.

16. A food container made from the composition of claim 7.

17. A food container made from the composition of claim 11.

* * * * *